(12) United States Patent
Itou et al.

(10) Patent No.: US 8,585,123 B2
(45) Date of Patent: Nov. 19, 2013

(54) DOOR TRIM FOR VEHICLE

(75) Inventors: Hiroyuki Itou, Inazawa (JP); Yutaka Kimoto, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/416,492

(22) Filed: Mar. 9, 2012

(65) Prior Publication Data

US 2012/0274095 A1 Nov. 1, 2012

(30) Foreign Application Priority Data

Apr. 28, 2011 (JP) ................................ 2011-101300

(51) Int. Cl.
*B60R 13/02* (2006.01)
(52) U.S. Cl.
USPC ........................................ 296/146.7; 49/502
(58) Field of Classification Search
USPC ..................... 296/146.7, 1.08, 1.09; 49/502
See application file for complete search history.

(56) References Cited

U.S. PATENT DOCUMENTS 5,251,403 A * 10/1993 Compeau et al. ............... 49/502
2011/0037289 A1* 2/2011 Moberg ..................... 296/146.7

FOREIGN PATENT DOCUMENTS

JP 11-286232 A 10/1999

* cited by examiner

*Primary Examiner* — Glenn Dayoan
*Assistant Examiner* — Melissa A Black
(74) *Attorney, Agent, or Firm* — Greenblum & Bernstein, P.L.C.

(57) ABSTRACT

A door trim for a vehicle includes a trim body and an armrest. The trim body has an armrest mount hole, a mount member arranged in an edge area of the armrest mount hole, and a support member. The armrest is fitted in the armrest mount hole. The armrest has a mount base to which the mount member is mounted. The mount base has a weak portion and is configured to be supported by the support member. The weak portion has lower rigidity than another portion of the mount base. The support member is configured to guide the mount base toward an outer side of an interior of the vehicle.

15 Claims, 10 Drawing Sheets

DOOR TRIM FOR VEHICLE

CROSS REFERENCE TO RELATED APPLICATION

This application claims priority from Japanese Patent Application No. 2011-101300 filed Apr. 28, 2011. The entire content of this priority application is incorporated herein by reference.

FIELD OF THE INVENTION

The present disclosure relates to a door trim for a vehicle.

BACKGROUND OF THE INVENTION

A known door trim for a vehicle includes a trim body (or a trim board) and an armrest projecting toward the inner side of the interior of the vehicle and mounted to the trim body. The armrest has a flange. The armrest is mounted to the trim board with bosses formed on the trim board fitted in holes of the flange.

Such an armrest needs to be easily deformed in the direction in which the armrest projects (i.e., in the horizontal direction of the vehicle) in a side collision. In the side collision, the armrest may hit an occupant of the vehicle. If the armrest is easily deformed, the impact on the occupant can be reduced. To make the armrest easily deformable, the armrest of the known door trim has a step between the flange and a body of the armrest so that the armrest easily breaks at the step in a side collision.

However, the armrest of the known door trim may not have sufficient rigidity for a downward force applied thereto, for example, when the occupant places his or her arm on the armrest.

SUMMARY OF THE INVENTION

The technology described herein has been made in view of the aforementioned circumstances. An objective of the technology is to provide a door trim having high rigidity for a downward force applied to an armrest and configured such that an impact on an occupant by the armrest in a side collision is reduced.

A door trim for a vehicle includes a trim body and an armrest. The trim body has an armrest mount hole, a mount member, and a support member. The mount member is arranged in an edge area of the armrest mount hole. The armrest is fitted in the armrest mount hole. The armrest has a mount base to which the mount member is mounted. The mount base has a weak portion. The mount base is configured to be supported by the support member. The weak portion has lower rigidity than another portion of the mount base. The support member is configured to guide the mount base toward an outer side of an interior of the vehicle.

With the weak portion of the mount base, the weak portion is easily deformed (or broken) when a force is applied to the armrest from the inner side of the interior in a side collision. As a result, the armrest is deformed and thus the impact on an occupant of the vehicle in the side collision can be reduced.

According to the technology described herein, the strength of the door trim to the load applied to the armrest from above can be increased and impact on the occupant in a side collision can be reduced. Namely, a door trim that can exert such effects can be provided.

DETAILED DESCRIPTION OF THE PREFERRED EMBODIMENTS

First Embodiment

Figure 1:
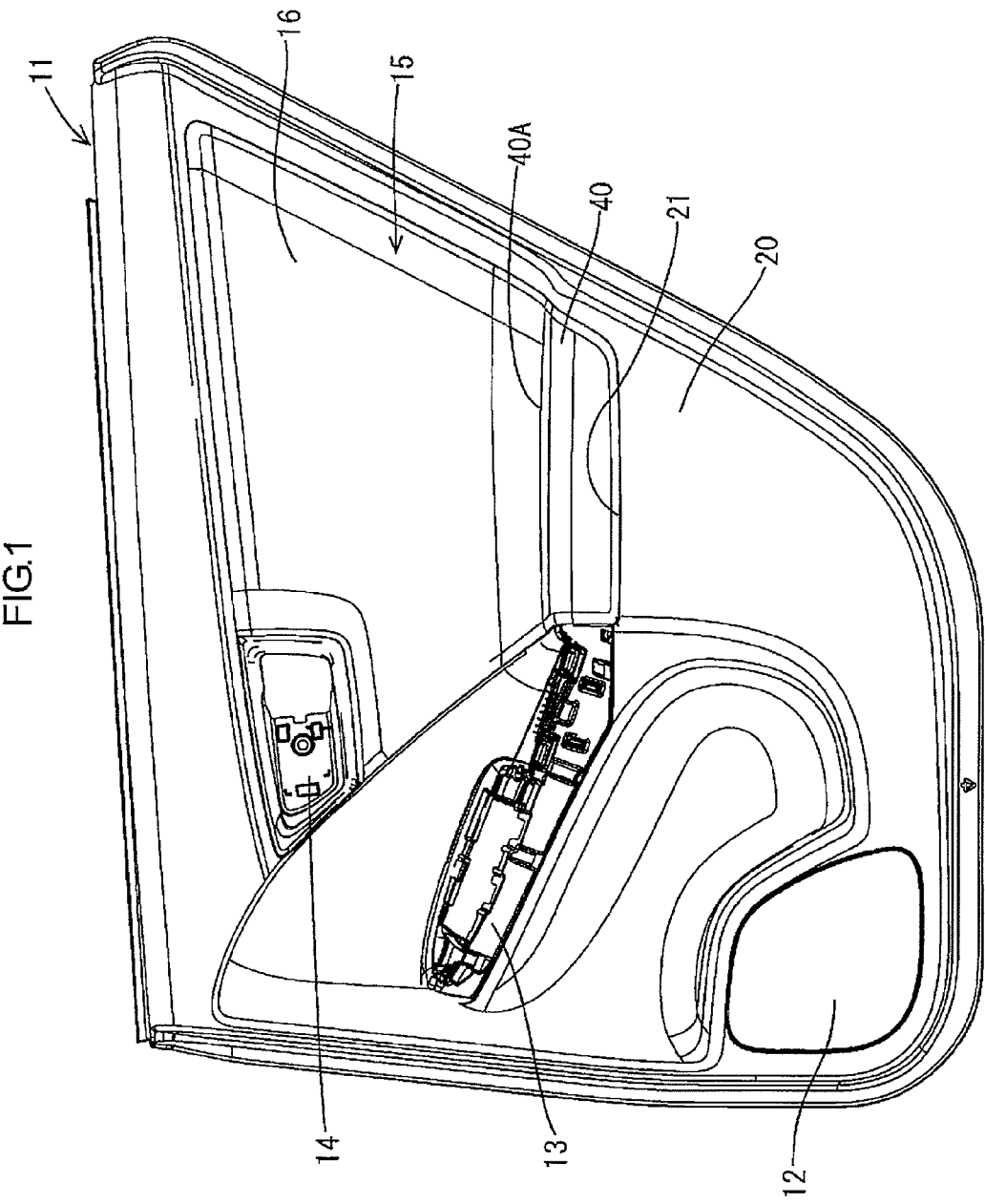
FIG. 1 is a front view of a door trim according to a first embodiment.
Figure 2:
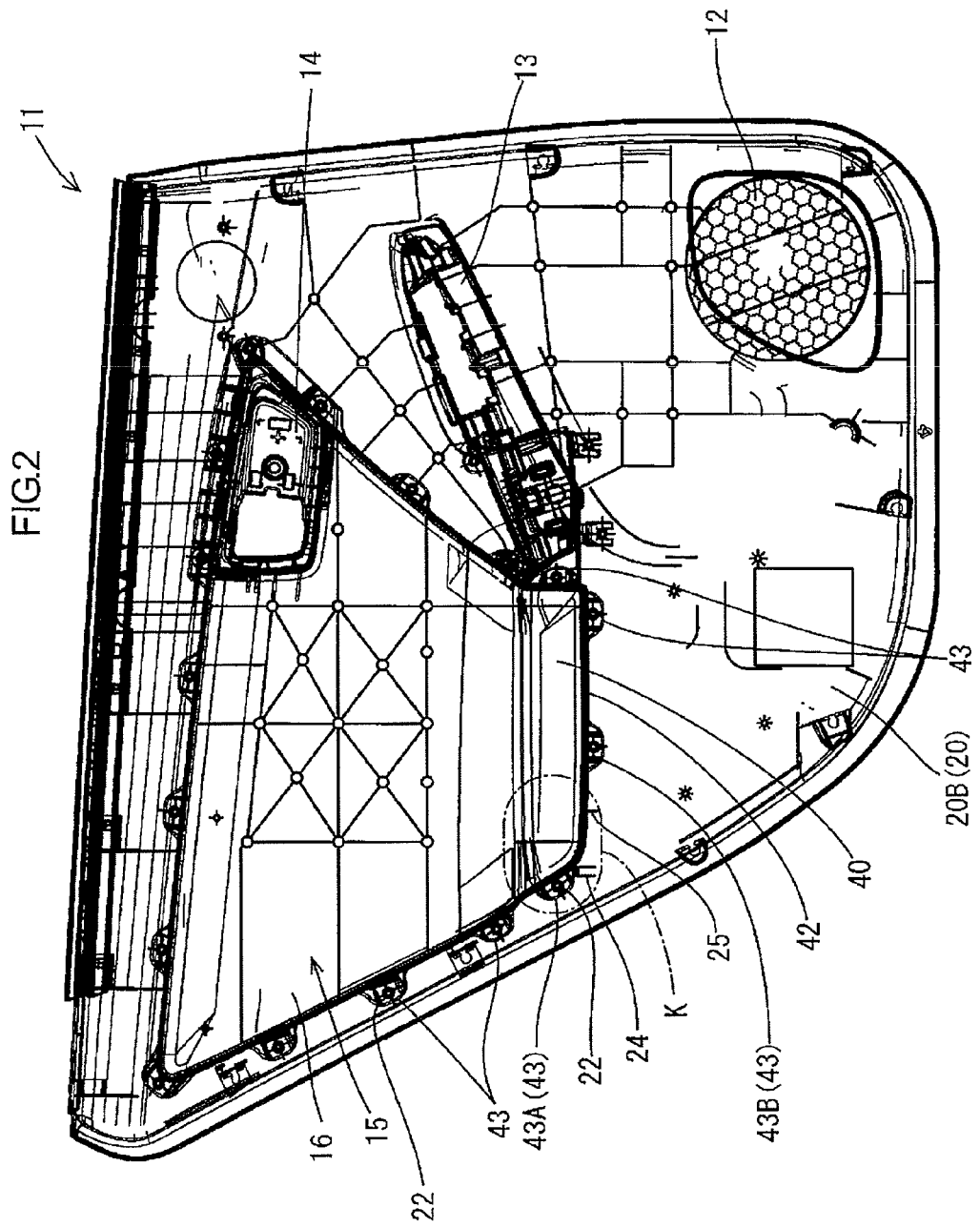
FIG. 2 is a backside view of the door trim in FIG. 1.

The first embodiment will be explained with reference to FIGS. 1 to 6. A door trim 11 is mounted on an inner side of a vehicular body panel (not illustrated) with clips (not illustrated). As illustrated in FIGS. 1 and 2, the door trim 11 includes a trim board 20 (a trim board body), a speaker grill 12, a switch base 13, and an inside handle well 14. The trim board 20 is made of synthetic resin or synthetic resin mixed with natural fibers such as kenaf fibers.

Figure 5:
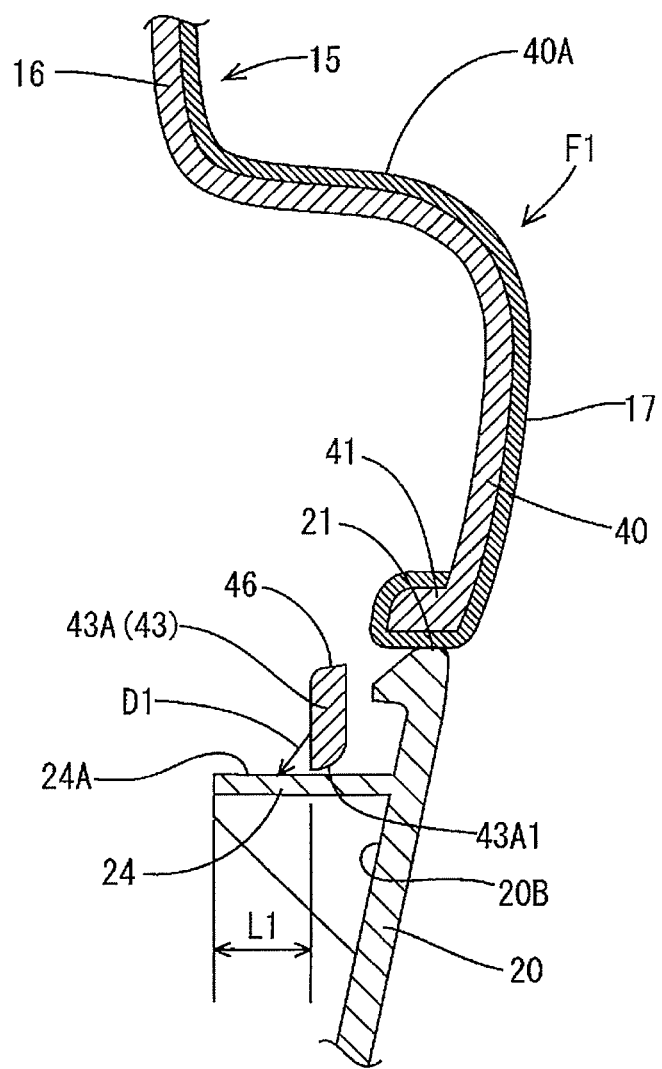
FIG. 5 is a cross-sectional view of the mount base and the projection along line A-A in FIG. 4.

The trim board 20 has a board mount hole 21 (an armrest mount hole) around the center thereof with respect to the vertical direction and closer to the rear edge thereof. A board 15 having an ornament 16 and an armrest 40 is fitted in the board mount hole 21. As illustrated in FIG. 5, the armrest 40 is formed by projecting a lower edge portion of the board 15 toward the inner side of the interior of the vehicle (toward the right in FIG. 5) so as to form a step. Namely, the ornament 16 and the armrest 40 are integrally formed.

Next, the board 15 and configurations around the armrest 40 will be explained. As illustrated in FIG. 2, the board 15 is mounted to the outer side of the trim board 20. The board 15 has a substantially trapezoidal shape with a width measuring in the front-rear direction of the vehicle decreasing toward the bottom.

Figure 3:
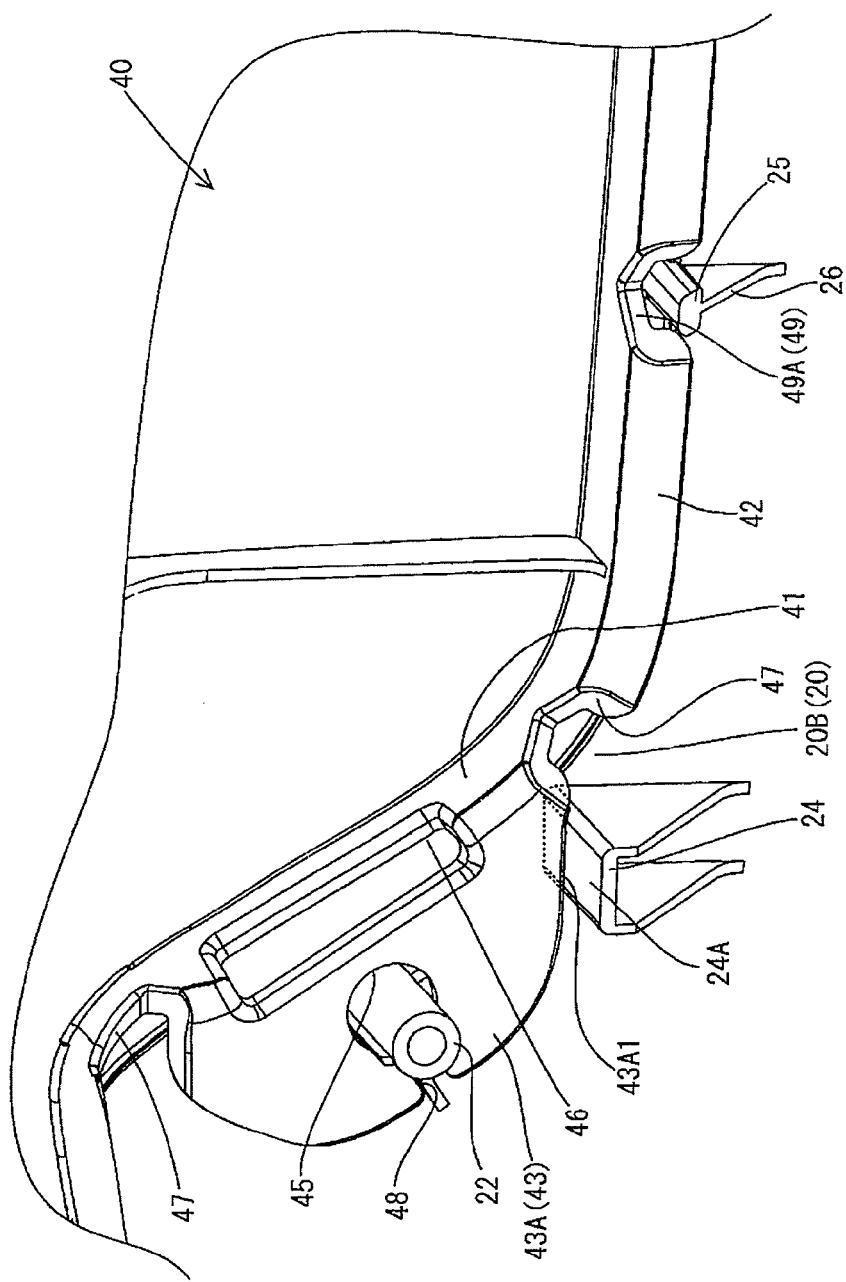
FIG. 3 is a magnified perspective view of the door trim around a mount base and a projection.

As illustrated in FIG. 3, the board 15 has a board portion and a raised portion raised from the board portion. The raised portion includes a rising wall 41 that rises from the edge of the board portion toward the outer side of the interior of the vehicle. A peripheral wall 42 projects from the edge of the rising wall 41 and extends in the direction in which the trim board 20 extends. A skin 17 is attached to the surface of the board 15 on the inner side of the interior of the vehicle so as to cover the surface (see FIG. 5).

As illustrated in FIG. 2, a plurality of mount tabs 43 extend outward from the peripheral wall 42. The mount tabs 43 are arranged along the periphery of the board 15 at predetermined intervals. As illustrated in FIGS. 2 and 3, mount bosses 22 are provided around the edge of the board mount hole 21 of the trim board at positions corresponding to the mount tabs 43. The mount bosses 22 project from the outer surface 20B of the trim board 20 on the outer side of the interior of the vehicle toward the outer side of the interior of the vehicle.

Figure 4:
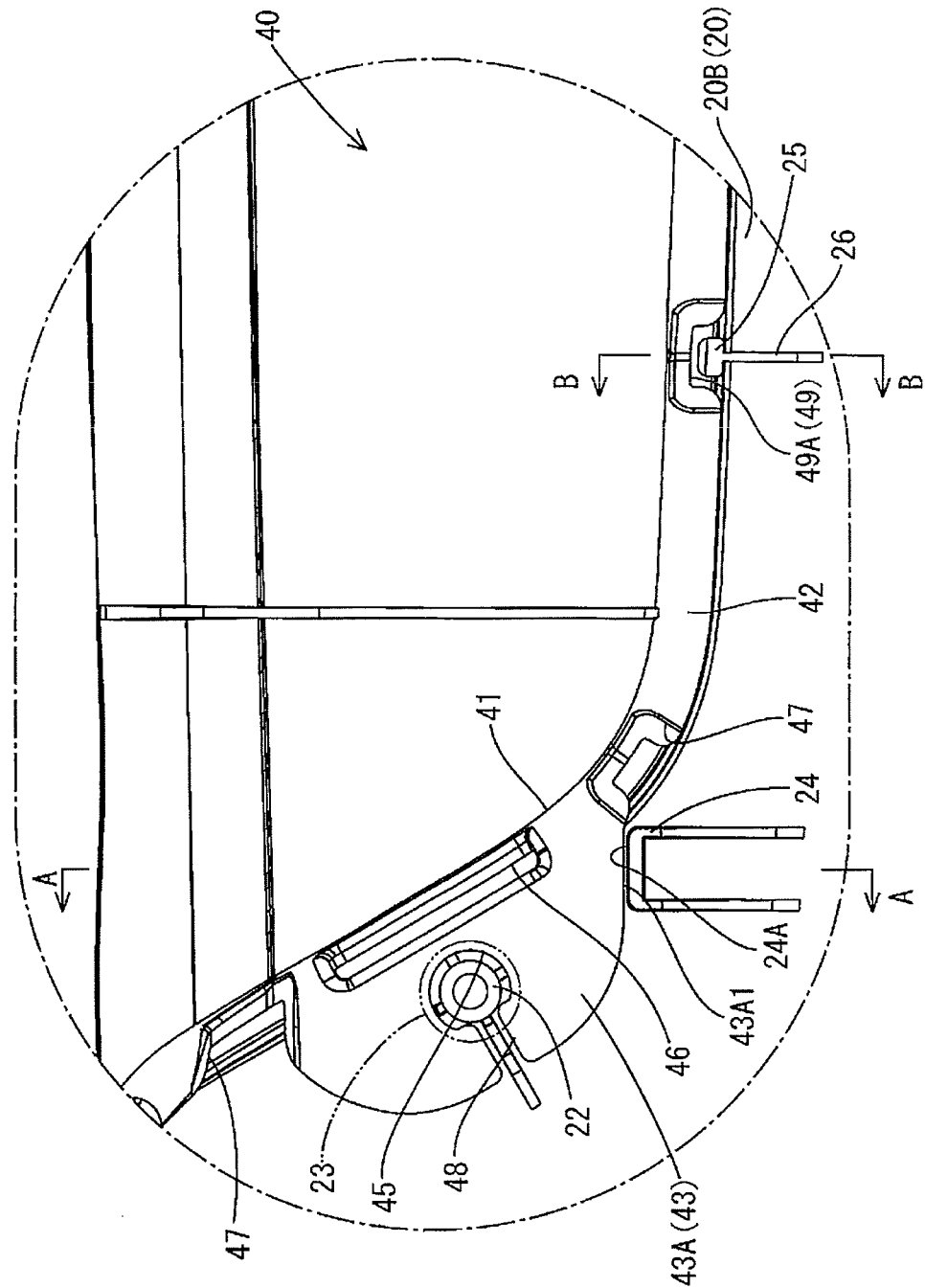
FIG. 4 is a magnified backside view of the door trim around the mount base and the projection.

As illustrated in FIGS. 3 and 4, each mount tab 43 has an insertion hole 45 that extends through the mount tab 43 in the width direction of the vehicle. The mount boss 22 is inserted in the insertion hole 45. A distal end of the mount boss 22 is welded or fused by ultrasonic welding after the mount boss 22 is inserted in the insertion hole 45. In FIGS. 3 and 4, the distal end of the boss 22 is in a condition before welding. In FIG. 4, the distal end of the mount boss 22 after the welding is illustrated by a chain double-dashed line. The distal end after the welding is referred to as a welded portion 23. FIGS. 3 and 4 are magnified views of an area K encircled by a chain line in FIG. 2 including the mounting tab 43, a projection 24, and their peripheral areas. The projection 24 will be explained later.

With the welded portion 23 covering the edge of the insertion hole 45 of the mount tab 43 from the outer side of the interior of the vehicle, the mount boss 22 is less likely to come out of the insertion hole 45. As a result, the mount tab 43 is properly attached to the trim board 20 and the board 15 is properly mounted to the trim board 20.

As illustrated in FIGS. 2 and 3, the trim board 20 has the projection 24 (a support member or a projection) which supports the mount tab 43 or the armrest 40. As illustrated in FIGS. 3 and 4, the projection 24 is arranged below one of the mount tabs 43 (referred to as the mount tab 43A) located at a rear end of the armrest 40 closer to the rear of the vehicle (a first end of the armrest, one of ends of the armrest with respect to the front-rear direction of the vehicle). The mount tab 43A may be located at a rear end corner of the armrest 40.

The projection 24 has a substantially U-shape with an open end at a lower side when viewed from the front as in FIG. 4. The projection 24 projects from the outer surface 20B of the trim board 20 toward the outer side of the interior of the vehicle. When a downward force is applied to the armrest from above, an upper surface 24A of the projection 24 supports a lower surface 43A1 of the mount tab 43A. By forming the projection 24 in the substantially U-shape, the rigidity of the projection 24 can be increased.

As illustrated in FIG. 4, the upper surface 24A of the projection 24 and the lower surface 43A1 of the mount tab 43A are arranged with a small gap therebetween. When the armrest 40 (or the mount tab 43A) moves downward, the mount tab 43A contacts the upper surface 24A of the projection 24. Namely, the mount tab 43A is supported by the projection 24.

When the armrest 40 moves toward the outer side of the interior of the vehicle relative to the door trim 11 due to a load applied from the inner side of the interior of the vehicle (or a lateral force), the mount tab 43A moves toward the outer side of the interior along the upper surface 24A of the projection 24. Namely, the projection 24 guides the mount tab 43A toward the outer side (or toward the left in FIG. 5).

The mount tab 43A has a plurality of weak portions. The weak portions are provided to make the mount tab 43A easily deformed (or broken) when a force is applied to the armrest 40 from the inner side of the interior in a side collision.

A through hole 46, a cutout 47, and a slit 48 illustrated in FIGS. 3 and 4 are formed in the weak portions. The through hole 46 extends along a boundary between the mount tab 43A and the rising wall 41 (or a base end of the mount tab 43A). The cutout 47 is formed by cutting out a part of the armrest 40 around a connecting portion between the mount tab 43A and the peripheral wall 42. As illustrated in FIG. 4, the slit 48 continues from the insertion hole 45 and extends to the peripheral edge (or the distal end) of the mount tab 43A.

The weak portions including the through hole 46, the cutout 47, and the slit 48, respectively, are formed in areas of the mount tab 43A other than an area to be in contact with the projection 24 (i.e., an area to be supported by the projection 24). More specifically, the cutout 47 and the slit 48 are formed in areas that do not overlap the projection 24 with respect to the front-rear direction of the vehicle (or the horizontal direction in FIG. 4).

Furthermore, a notch 49 is formed at a lower edge portion of the armrest 40 so as to extend in the width direction of the vehicle. A lower edge support member 25 projecting from the outer surface 20B of the trim board 20 toward the outer side of the interior is fitted in the notch 49. The lower edge support member 25 extends in the width direction of the vehicle.

Figure 6:
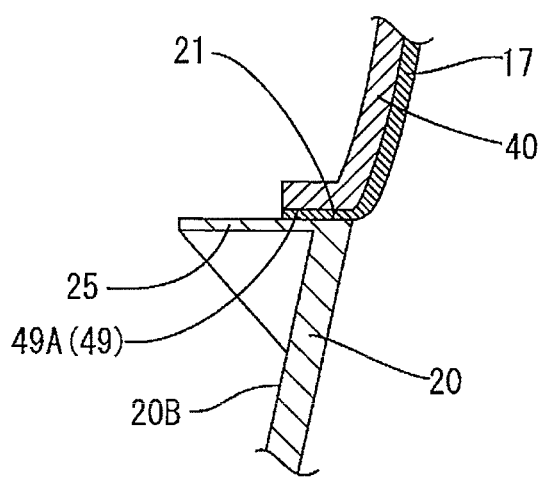
FIG. 6 is a cross-sectional view of a lower edge support member along line B-B in FIG. 4.

As illustrated in FIGS. 4 and 6, the lower edge support member 25 is brought into contact with a back wall 49A of the notch 49 when a downward force is applied to the armrest from above. With this configuration, the lower edge support member 25 supports the armrest 40. Because the lower edge support member 25 that extends in the width direction of the vehicle is fitted in the notch 49 that also extends in the width direction, the movement of the armrest in the front-rear direction of the vehicle is restricted. Furthermore, with the above configuration, the armrest 40 is guided toward the outer side of the interior. An enforcement rib 26 is connected between the lower surface of the lower edge support member 25 and the outer surface 20B of the trim board 20B. With this configuration, the lower edge support member 25 is provided with high rigidity.

Next, effects of this embodiments will be explained. The mount tab 43A of the armrest 40 has the weak portions including the through hole 46, the cutout 47, and the slit 48, respectively. With this configuration, the mount tab 43A is easily deformed or broken when a load is applied to the armrest 40 from the inner side of the interior in the side collision. Therefore, the armrest 40 is easily deformed and thus the impact on the occupant in the side collision can be reduced.

The mount tab 43A of the armrest 40 is supported by the projection 24 of the trim board 20. With this configuration, the mount tab 43A is supported by the projection 24 when a downward force is applied to the armrest 40 from above, that is, the rigidity of the armrest 40 increases. Even though the mount tab 43A has the weak portions, the strength of the armrest 40 against the downward force applied thereto from above can be increased.

The armrest 40 is usually used by an occupant for placing his or her arm on the upper surface 40A thereof (see FIG. 5) from the inner side of the interior. When the armrest 40 is used in such a condition, an oblique downward force toward the outer side of the interior is applied thereto (indicated by symbol F1 in FIG. 5).

If the projection 24 is not provided, the mount tab 43A moves toward the outer side of the interior by the force F1. As a result, a load concentrates at the welded portion 23 of the mount boss 22. The moving direction of the mount tab 43A is indicated by arrow D1 in FIG. 5. The welded portion 23 tends to receive a load by which the welded portion 23 comes off toward the outer side of the interior.

The movement of the mount tab 43A is restricted by the projection 24 that supports the mount tab 43A. A length L1 of the projection 24 measuring from the mount tab 43A to the distal end of the projection 24 in the width direction of the vehicle, that is, the horizontal direction in FIG. 5 may be set to 5 mm or longer. With this configuration, the restriction of the movement of the mount tab 43A by the projection 24 is made more reliable. However, the projection 24 can be provided in any length.

The projection 24 is configured to guide the mount tab 43A toward the outer side of the interior of the vehicle. In a side collision, the armrest 40 may receive a load from the inner side of the interior and move toward the outer side of the interior relative to the trim board 20. In such a case, the mount tab 43A moves toward the outer side of the interior relative to the projection 24. In the side collision, the movement of the mount tab 43A toward the outer side of the interior is less likely to be restricted by the projection 24. Therefore, the impact on the occupant in the side collision can be reduced.

The weak portions including the through hole 46, the cutout 47, and the slit 48, respectively, are formed in the areas other than the area supported by the projection 24.

With this configuration, the area of the mount tab 43A in which the weak portions are not provided is supported by the projection 24. In comparison to a configuration in which an area supported by the projection 24 includes the weak portions, the mount tab 43A is more reliably supported. Therefore, the movement of the armrest 40 toward the outer side of the interior relative to the projection 24 in the side collision is not restricted and thus the deformation of the weak portions of the armrest 40 is not restricted.

The mount tab 43A is provided at one of the ends of the armrest 40 with respect to the front-rear direction of the vehicle, specifically, at the rear end closer to the rear of the vehicle.

The armrest 40 is fitted in the board mount hole 21. When the armrest 40 is pressed from the inner side of the interior, more stress is applied to the rear end than the center of the armrest with respect to the front-rear direction of the vehicle. In this embodiment, the rear end is supported when the armrest 40 is pressed. Namely, the strength of the armrest 40 can be improved.

The board 15 is in a substantially trapezoidal shape, or may be in a substantially rectangular shape. In such a configuration, that is, the configuration in which the armrest 40 has a corner, the stress tends to concentrate on the corner when the armrest 40 is pressed. In this embodiment, the corner, more specifically, the mount tab 43A is supported by the projection 24. Therefore, the strength of the armrest 40 against a load applied when the occupant uses the armrest 40 can be further increased.

The mount boss 22, the mount tab 43A, and the projection 24 are provided as a mount member, a mount base, and a support member, respectively. The mount boss 22 projects from the trim board 20 toward the outer side of the interior of the vehicle. The mount tab 43A has the insertion hole 45 in which the mount boss 22 is inserted. The projection 24 projects from the trim board 20 toward the outer side of the interior.

The mount boss 22 and the mount tab 43 are fixed together only by inserting the mount boss 22 in the insertion hole 45. The mount base, the mount member, and the support member are provided in relatively simple configurations.

The lower edge of the armrest 40 has the notch 49 extending in the width direction of the vehicle and opening through the bottom. The trim board 20 has the lower edge support member 25 formed in a shape so as to extend in the width direction of the vehicle and fit in the notch 49. The lower edge support member 25 is fitted in the notch 49. The lower edge support member 25 supports the armrest 40 and guides the movement of the armrest toward the outer side of the interior.

The area of the armrest 40 other than the area supported by the projection 24 (or the mount tab 43A) is supported by the lower edge support member 25. With this configuration, the armrest 40 is more properly supported. The lower edge support member 25 is fitted in the notch 49 that extends in the width direction of the vehicle. Because the lower edge support member 25 is fitted in the notch 49, the armrest 40 is guided toward the outer side of the interior by the lower edge support member 25. In a side collision, the armrest 40 is more properly guided toward the outer side of the interior. Therefore, the movement of the armrest 40 toward the outer side of the interior relative to the projection 24 and the lower edge support member 25 is less likely to be restricted.

Second Embodiment

The second embodiment will be explained with reference to FIG. 7. The same parts as those in the first embodiment will be indicated by the same symbols and will not be explained. A door trim 111 of this embodiment includes the projection 24 (a support member) in a different location from that in the first embodiment and the mount tab 43 has different weak portions.

Figure 7:
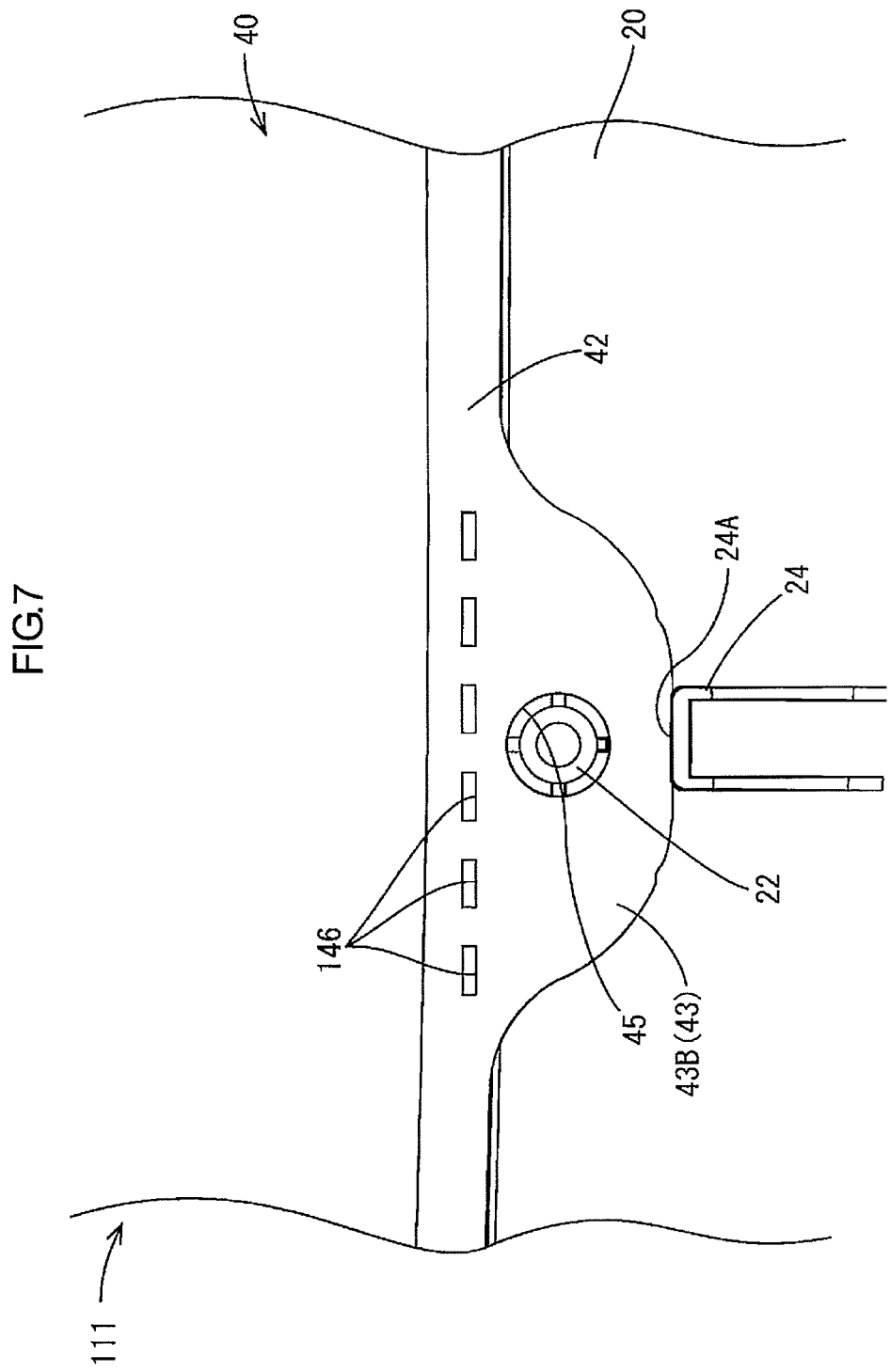
FIG. 7 is a backside view of a mount base and a projection according to a second embodiment.

As illustrated in FIGS. 2 and 7, the projection 24 is arranged below one of the mount tabs 43 in the middle of the armrest 40 with respect to the front-rear direction of the vehicle. The one of the mount tabs 43 is referred to as the mount tab 43B hereinafter. When a downward force is applied to the armrest 40 from above, the mount tab 43B is supported by the projection 24.

The mount tab 43B has a weak portion including a plurality of through holes 146. The through holes 146 are formed close to a base of the mount tab 43B (or closer to the peripheral wall 42 than the insertion hole 45). The through holes 146 are arranged along the front-rear direction of the vehicle. With the through hole 146, the armrest 40 is easily deformed in a side collision and thus the impact on the occupant can be reduced.

Third Embodiment

The third embodiment will be explained with reference to FIG. 8. The same parts as those in the above embodiments will be indicated by the same symbols and will not be explained. A door trim 211 in this embodiment includes a mount tab having a weak portion different from those in the second embodiment.

Figure 8:
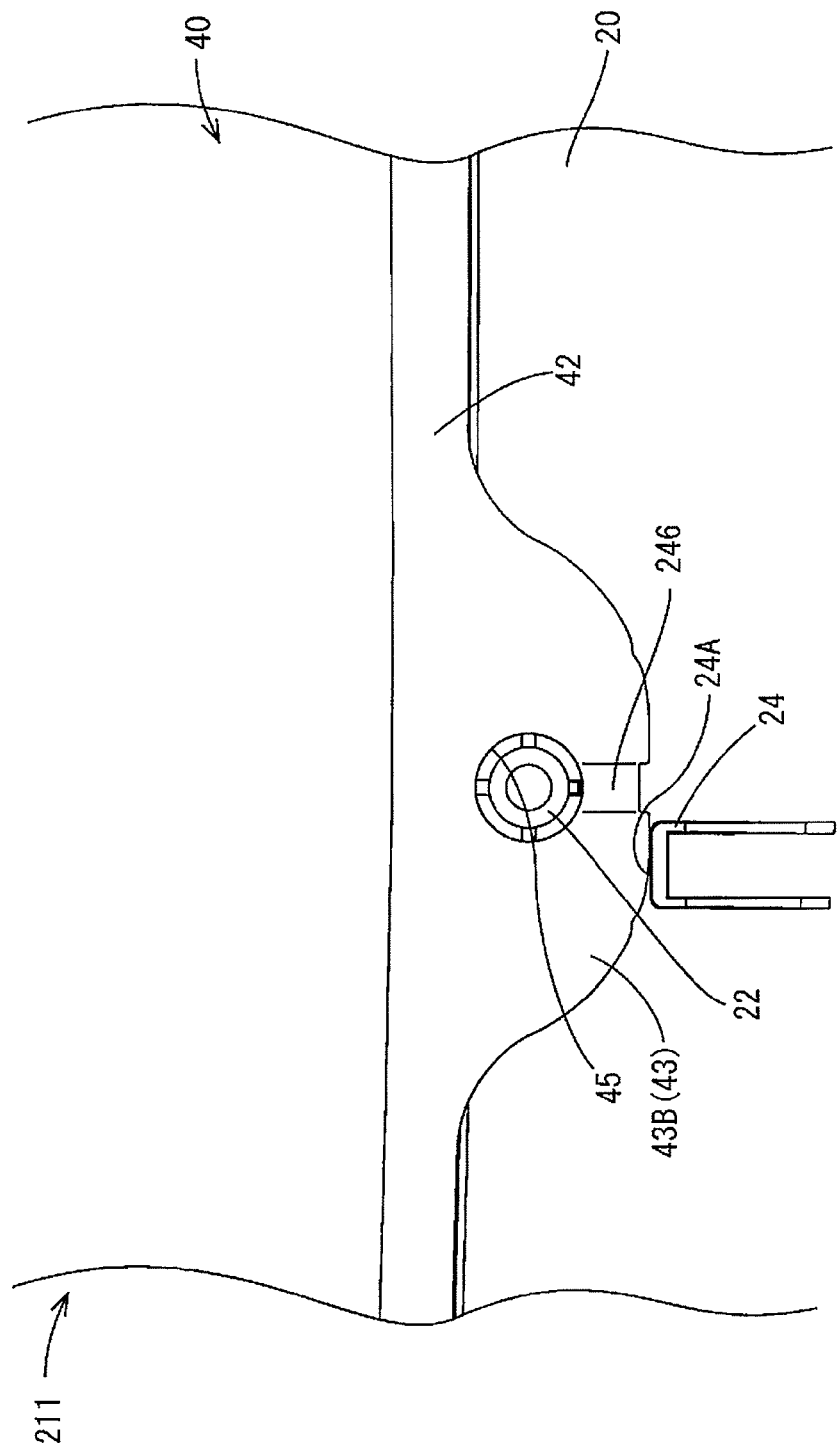
FIG. 8 is a backside view of a mount base and a projection according to a third embodiment.

As illustrated in FIG. 8, the mount tab 43B has a thin portion 246 (a weak portion). The thin portion 246 has a smaller thickness than the thickness of portions around the thin portion 246. The thin portion 246 extends from the edge of the insertion hole 45 to a peripheral edge (or a distal end) of the mount tab 43B. With the thin portion 246, the armrest 40 is easily deformed in a side collision and thus the impact on the occupant can be reduced.

The thin portion 246 is formed at a portion different from the projection 24 with respect to the front-rear direction of the vehicle. Namely, the thin portion 246 is formed in an area of the mount tab 43B other than an area of the mount tab 43B supported by the projection 24.

Fourth Embodiment

The fourth embodiment will be explained with reference to FIG. 9. The same parts as those in the above embodiments will be indicated by the same symbols and will not be explained. A door trim 311 in this embodiment includes a mount tab having a weak portion different from those in the second and the third embodiments.

Figure 9:
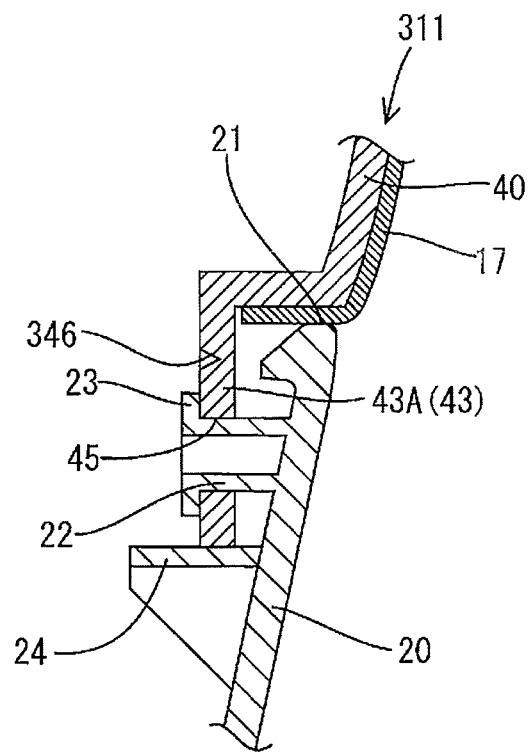
FIG. 9 is a backside view of a mount base and a projection according to a fourth embodiment.

As illustrated in FIG. 9, the mount tab 43B has a weak portion including a groove 346 with a depth measuring in a direction toward the inner side of the interior of the vehicle (toward the right in FIG. 9). The groove 346 is formed in the mount tab 43B close to the base end. With the groove 346, the armrest 40 is easily deformed in a side collision and thus the impact on the occupant can be reduced.

Other Embodiments

The technology described herein is not limited to the above embodiments explained in the above description and the drawings. The technology described herein may include the following embodiments.

(1) The mount tabs 43 may be attached to the trim board 20 with screws. The mount members and the mount bases are not limited to the configurations described in the above embodiments. The configurations of the mount members and the mount bases can be altered as long as the armrest 40 can be mounted to the trim board 20 with the mount members and the mount bases.

(2) The weak portions are not limited to those in the above embodiments. The weak portions can be provided in any configurations as long as the rigidity thereof is lower than that of other portions of the mount bases, that is, the mount tabs 43.

(3) The armrest 40 and the ornament 16 may be provided as different parts. The shape of the armrest 40 is not limited to that in the above embodiments. The armrest 40 can be formed in any shape.

Figure 10:
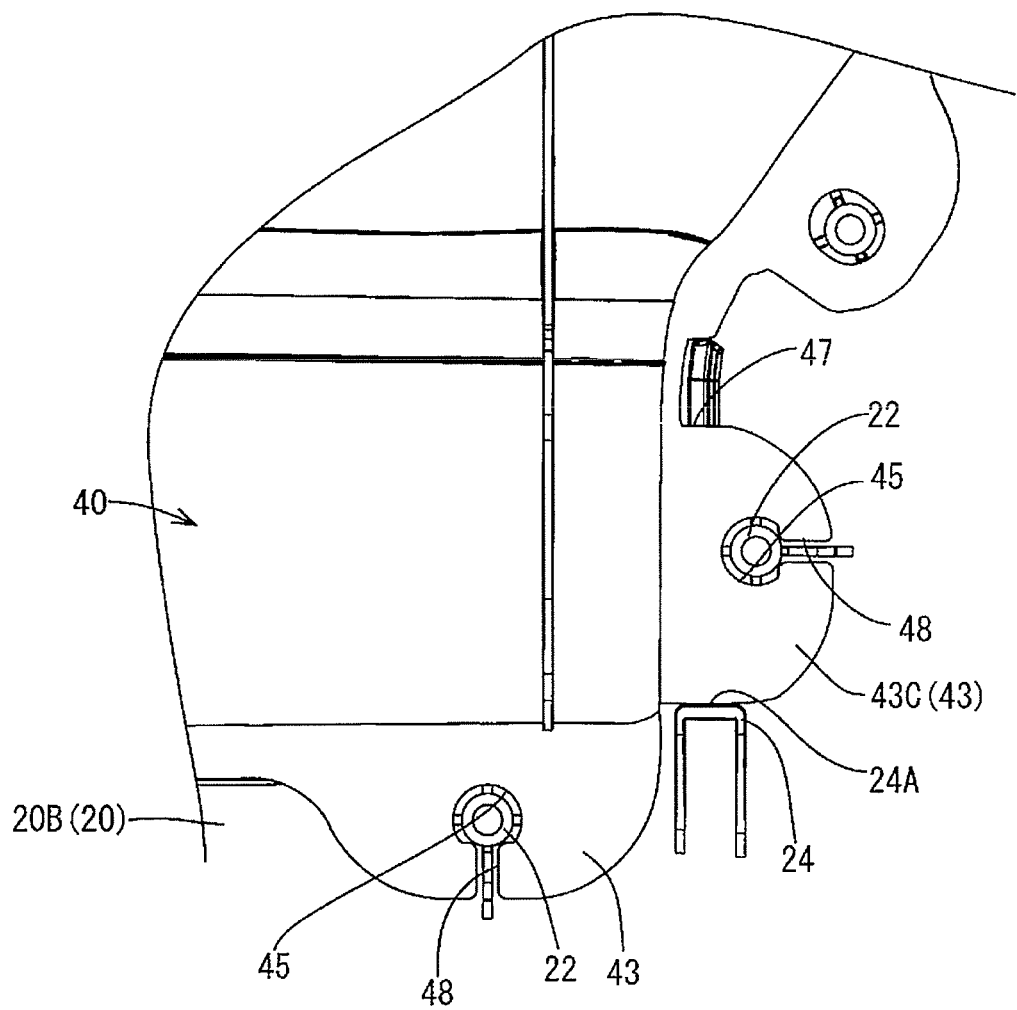
FIG. 10 is a backside view illustrating another embodiment.

(4) The projection 24 (the support member) can be arranged in any locations. As illustrated in FIG. 10, the projection 24 may be configured to support the mount tab 43C at the front edge (at the right edge in FIG. 10).

(5) The projection 24 may be arranged such that the upper surface 24A thereof is in contact with the lower edge surface 43A of the mount tab 43A. Whether or not the projection 24 is in contact with the mount tab 43A is not a matter as long as the projection 24 is configured to support the mount tab 43A.

(6) The mount bases may be provided as separate parts from the armrest 40. The mount members may be provided as separate parts from the trim board 20.

What is claimed is:

1. A door trim for a vehicle, comprising:
a trim body having an armrest mount hole, a mount member arranged in an edge area of the armrest mount hole, and a support member; and
an armrest fitted in the armrest mount hole, the armrest having a mount base to which the mount member is mounted, the mount base having a weak portion and being configured to be supported at a lower surface thereof by the support member, the weak portion having lower rigidity than another portion of the mount base,
wherein the support member is configured to guide the mount base toward an outer side of an interior of the vehicle, and
wherein the lower surface of the mount base is spaced from an upper surface of the support member by a small gap, and when a downward force acts on the armrest, the lower surface of the mount base contacts the upper surface of the support member.

2. The door trim according to claim 1, wherein the weak portion of the mount base is located in an area not to be supported by the support member.

3. The door trim according to claim 1, wherein the mount base is provided at least one of a front end and a rear end of the armrest with respect to a front-rear direction of the vehicle.

4. The door trim according to claim 1, wherein
the mount member is a mount boss projecting from the trim body toward the outer side of the interior of the vehicle,
the mount base is a mount tab having an insertion hole in which the mount boss is inserted, and
the support member is a projection projecting from the trim body toward the outer side of the interior of the vehicle.

5. The door trim according to claim 1, wherein
the armrest has a notch formed in a lower edge portion of the armrest, the notch opening through a bottom of the armrest, and
the trim body has a lower edge support member extending in a width direction of the vehicle and fitted in the notch, the lower edge support member being configured to support the armrest and to guide the armrest toward the outer side of the interior of the vehicle.

6. The door trim according to claim 1, wherein
the mount base is arranged at a lower rear end corner of the armrest, and
the support member is arranged below the mount base so as to support the mount base from below.

7. The door trim according to claim 4, wherein
the weak portion is located at a base end of the mount tab and has a through hole, and
the mount tab includes a plurality of weak portions, at least one of the plurality of weak portions having a slit continuing from the insertion hole to an distal end of the mount tab, and at least another of the plurality of weak portions having a cutout at least in an area defined by the base end and a lower edge of the mount tab.

8. The door trim according to claim 1, wherein
the mount base is arranged at a middle of a lower edge of the armrest, and
the weak portion is located at a base end of the mount base and includes a plurality of through holes.

9. The door trim according to claim 4, wherein
the mount tab is arranged at a middle of a lower edge of the armrest, and
the weak portion is located between the insertion hole and a distal end of the mount tab, the weak portion having a smaller thickness than a thickness of another portion of the mount tab.

10. The door trim according to claim 1, wherein
the mount base is arranged at a lower edge of the armrest, and
the weak portion is located at a base end of the mount base, the weak portion having a groove with a depth measuring in a direction toward an inner side of the interior of the vehicle.

11. The door trim according to claim 4, wherein
the mount tab is arranged at a front edge of the armrest, and
the weak portion has a slit continuing from the insertion hole to an distal end of the mount tab.

12. The door trim according to claim 4, wherein
the lower surface of the mount tab is spaced from an upper surface of the projection by a small gap, and when a downward force acts on the armrest, the lower surface of the mount tab contacts the upper surface of the projection.

13. A door trim for a vehicle, comprising:
a trim body having an armrest mount hole, a mount member arranged in an edge area of the armrest mount hole, and a support member arranged adjacent to an edge of the armrest mount hole in a lower portion of the armrest mount hole and projecting toward an outer side of the vehicle when the door trim is installed in the vehicle; and
an armrest fitted in the armrest mount hole, the armrest including:
a step portion projecting from the armrest mount hole toward an inner side of the vehicle when the door trim is installed in the vehicle, the step portion including an upper surface configured to receive a downward force; and
a mount base to which the mount member is mounted to fix the armrest to the trim body, the mount base extending from a lower edge of the step portion, being arranged immediately above the support member such that a lower surface thereof is supported by the support member when the downward force is applied to the upper surface, and having at least one of a through hole, a plurality of through holes, a thin portion and a groove arranged adjacent to the mount member such that when a load is applied to the armrest from the inner side of the vehicle the mount base is deformed and guided by the support member to move toward the outer side of the vehicle, wherein the lower surface of the mount base is spaced from an upper surface of the support member by a small gap, and when a downward force acts on the armrest, the lower surface of the mount base contacts the upper surface of the support member.

14. The door trim according to claim 13, wherein the armrest has a notch formed in a lower edge portion of the armrest, the notch opening through a bottom of the armrest, and the trim body has a lower edge support member extending in a width direction of the vehicle and fitted in the notch, the lower edge support member being configured to support the armrest and to guide the armrest toward the outer side of the interior of the vehicle.

15. The door trim according to claim 13, wherein when the mount base has the thin portion arranged adjacent to the mount member, the thin portion has a thickness smaller than a thickness of other portions of the mount base.

* * * * *